United States Patent
Sun et al.

(10) Patent No.: US 10,601,689 B2
(45) Date of Patent: Mar. 24, 2020

(54) METHOD AND SYSTEM FOR HANDLING HETEROGENEOUS JITTER

(71) Applicant: Dolby Laboratories Licensing Corporation, San Francisco, CA (US)

(72) Inventors: Xuejing Sun, Beijing (CN); JiaQuan Huo, Hurstville Grove (AU); Paul Holmberg, Marsfield (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 64 days.

(21) Appl. No.: 15/763,623

(22) PCT Filed: Sep. 27, 2016

(86) PCT No.: PCT/US2016/054003
§ 371 (c)(1),
(2) Date: Mar. 27, 2018

(87) PCT Pub. No.: WO2017/058815
PCT Pub. Date: Apr. 6, 2017

(65) Prior Publication Data
US 2018/0287910 A1    Oct. 4, 2018

Related U.S. Application Data

(60) Provisional application No. 62/247,018, filed on Oct. 27, 2015.

(30) Foreign Application Priority Data

Sep. 29, 2015    (WO) ................ PCT/CN2015/091037
Nov. 13, 2015    (EP) ..................................... 15194485

(51) Int. Cl.
*H04L 12/841*    (2013.01)
*H04L 12/853*    (2013.01)
(Continued)

(52) U.S. Cl.
CPC ........ *H04L 43/087* (2013.01); *H04L 47/2416* (2013.01); *H04L 47/283* (2013.01); *H04L 43/16* (2013.01); *H04M 7/006* (2013.01)

(58) Field of Classification Search
CPC .. H04L 43/087; H04L 47/2416; H04L 47/283
See application file for complete search history.

(56) References Cited

U.S. PATENT DOCUMENTS 6,366,959 B1    4/2002    Sidhu
7,079,486 B2 *   7/2006    Colavito ............. H04L 12/6418
                                                             370/231
(Continued)

FOREIGN PATENT DOCUMENTS

CN    103594103    2/2014
EP    1891502      4/2011
(Continued)

OTHER PUBLICATIONS

Mansour, Y. et al "Jitter Control in Qos Networks" Foundations of Computer Sciences, Nov. 8, 1998, pp. 50-59. IEEE Computer Science 39th Annual Symposium.
(Continued)

*Primary Examiner* — Robert C Scheibel (57) ABSTRACT

In a packet switched voice delivery application which utilizes a jitter buffer for the delivery of sequential packet data, a method of determining a measure of the output jitter of taking packets out of the buffer, the method including the step of: (a) forming a pull jitter measure comprising the differential fetch times between sequential pull packets dived by an expected time interval between packets.

15 Claims, 5 Drawing Sheets

(51) Int. Cl.
  *H04L 12/26* (2006.01)
  *H04M 7/00* (2006.01)

(56) References Cited

U.S. PATENT DOCUMENTS

| | | | |
|---|---|---|---|
| 7,246,057 B1 * | 7/2007 | Sundqvist | H04L 12/6418 704/219 |
| 7,881,284 B2 | 2/2011 | Lin | |
| 8,160,112 B2 | 4/2012 | Shaffer | |
| 9,882,818 B2 * | 1/2018 | Shao | H04L 43/087 |
| 2007/0206645 A1 | 9/2007 | Sundqvist | |
| 2010/0290454 A1 * | 11/2010 | Lundberg | H04J 3/0632 370/352 |
| 2014/0072000 A1 * | 3/2014 | Shiva | H04J 3/062 370/516 |
| 2015/0092585 A1 * | 4/2015 | Shao | H04L 43/087 370/252 |
| 2015/0350099 A1 | 12/2015 | Sun | |

FOREIGN PATENT DOCUMENTS

| | | |
|---|---|---|
| WO | 2008/051181 | 5/2008 |
| WO | 2009/070093 | 6/2009 |

OTHER PUBLICATIONS

Yuang, M.C. et al "An Intelligent Synchronization Platform with QOS Guarantees for Multimedia Communications" IEEE International Conference on Communications, Jun. 6-10, 1999, pp. 216-220.

Lee, S. et al "An Integrated Push/Pull Buffer Management Method in Multimedia Communication Environments" ACM Workshop Conference, Jun. 2000, pp. 1-5.

* cited by examiner

METHOD AND SYSTEM FOR HANDLING HETEROGENEOUS JITTER

CROSS-REFERENCE TO RELATED APPLICATIONS

This application claims priority from PCT/CN2015/091037 filed 29 Sep. 2015; U.S. Patent Application No. 62/247,018 filed 27 Oct. 2015 and European Patent Application No. 15194485.7 filed 13 Nov. 2015, which are hereby incorporated by reference in their entirety.

FIELD OF THE INVENTION

The present invention relates to the field of handling jitter in computer networks and, in particular, discloses a method and system for handling jitter from multiple input and output sources and the determination of appropriate jitter measures.

BACKGROUND

Any discussion of the background art throughout the specification should in no way be considered as an admission that such art is widely known or forms part of common general knowledge in the field.

The quality of Internet Applications such as VoIP applications often rely heavily on an effective packet switched communications network. The nature of a packet switched network is that packets arrived in a temporally spread manner, with occasional packet losses. A jitter buffer is normally provided to 'regularise' the packet output.

Figure 1:
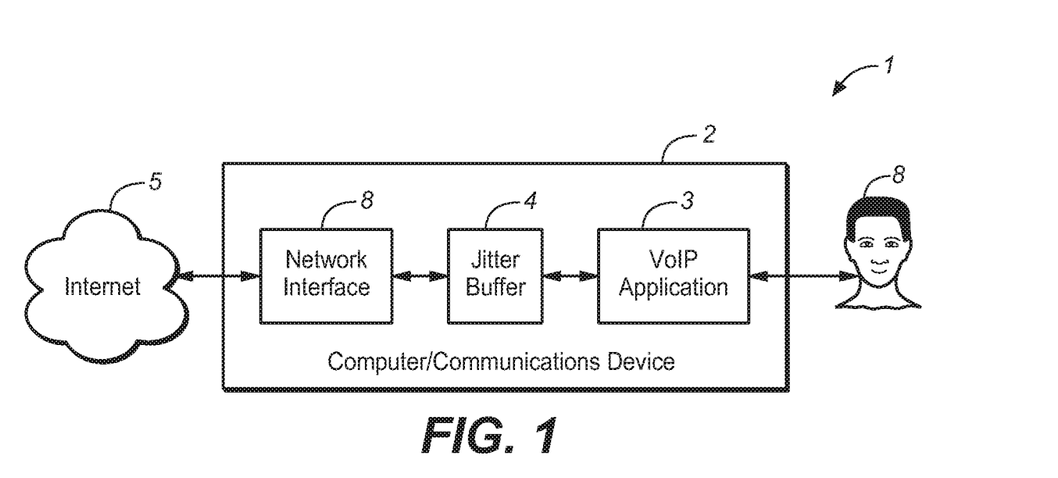
FIG. 1 illustrates a simplified schematic of the operation of a jitter buffer in a VoIP application.

By way of example, such an arrangement is illustrated schematically in FIG. 1, wherein a computer and communications device 2 is utilised to run a VoIP application 3 for a user 6 to undertake internet based voice or video conferencing over the Internet. Packets are received from the internet 5 and placed in a jitter buffer 4 on arrival, for forwarding to the VoIP Application 3 on demand. The VoIP application is responsible for accessing packets from the jitter buffer and transcoding the packet information into a suitable output format.

In the example VoIP system, jitter comes in many forms, such as network jitter, device scheduling jitter, etc. Conventional VoIP jitter buffer algorithms often mainly deal with network jitter while leaving other types of jitter unhandled.

For various non-network jitter, of particular interest is the 'fetch' or pull jitter that occurs when the audio subsystem pulls packets from the jitter buffer at variable time intervals. Pull jitter may arise due to a number of reasons. For example, rebuffering output audio to interface with audio devices operating at different sample rates; audio device pull timing jitter; operating system scheduling etc.

Figure 2:
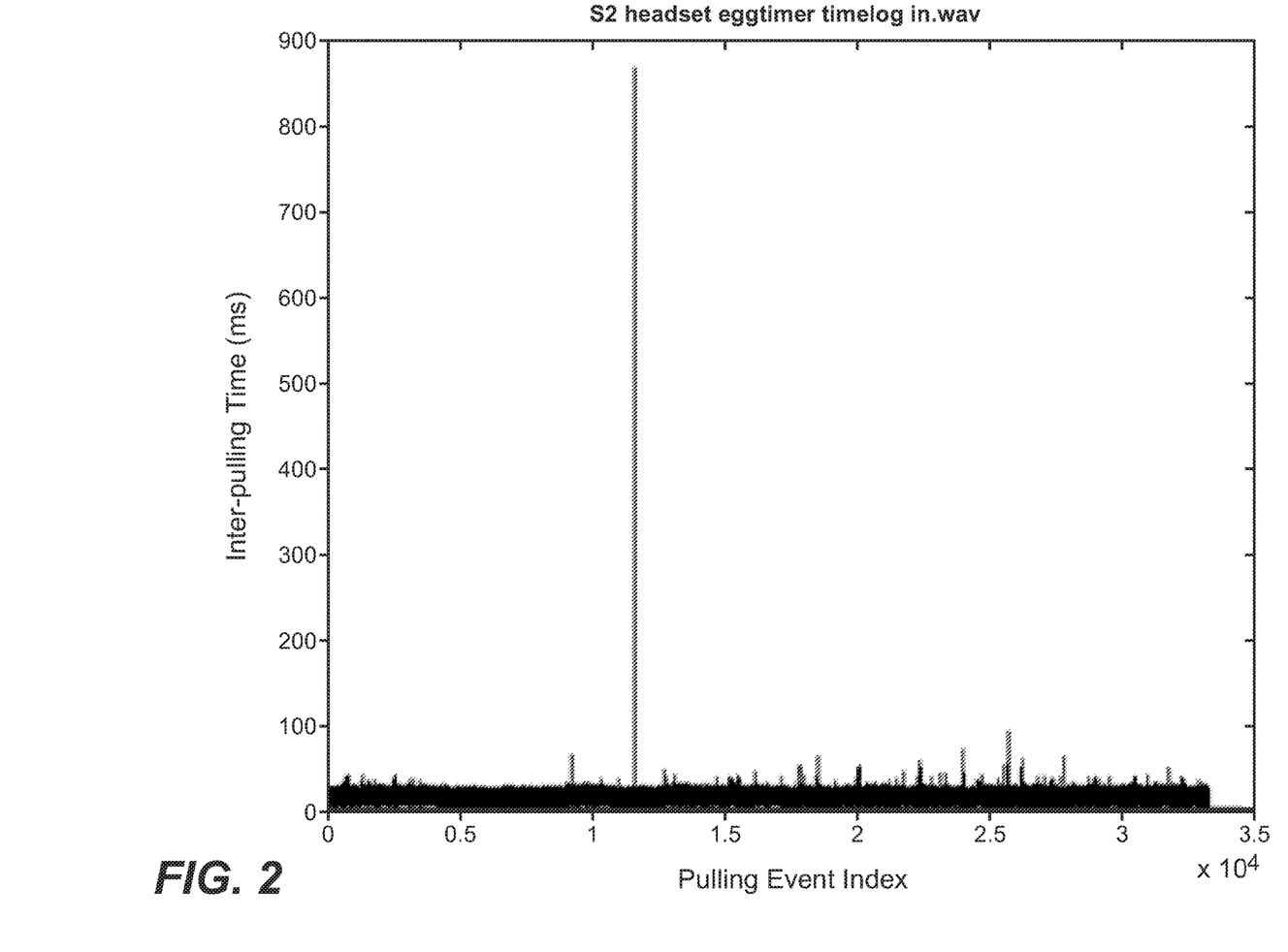
FIG. 2 to FIG. 5 are example trace plots of output or pull jitter for a number of applications.
Figure 3:
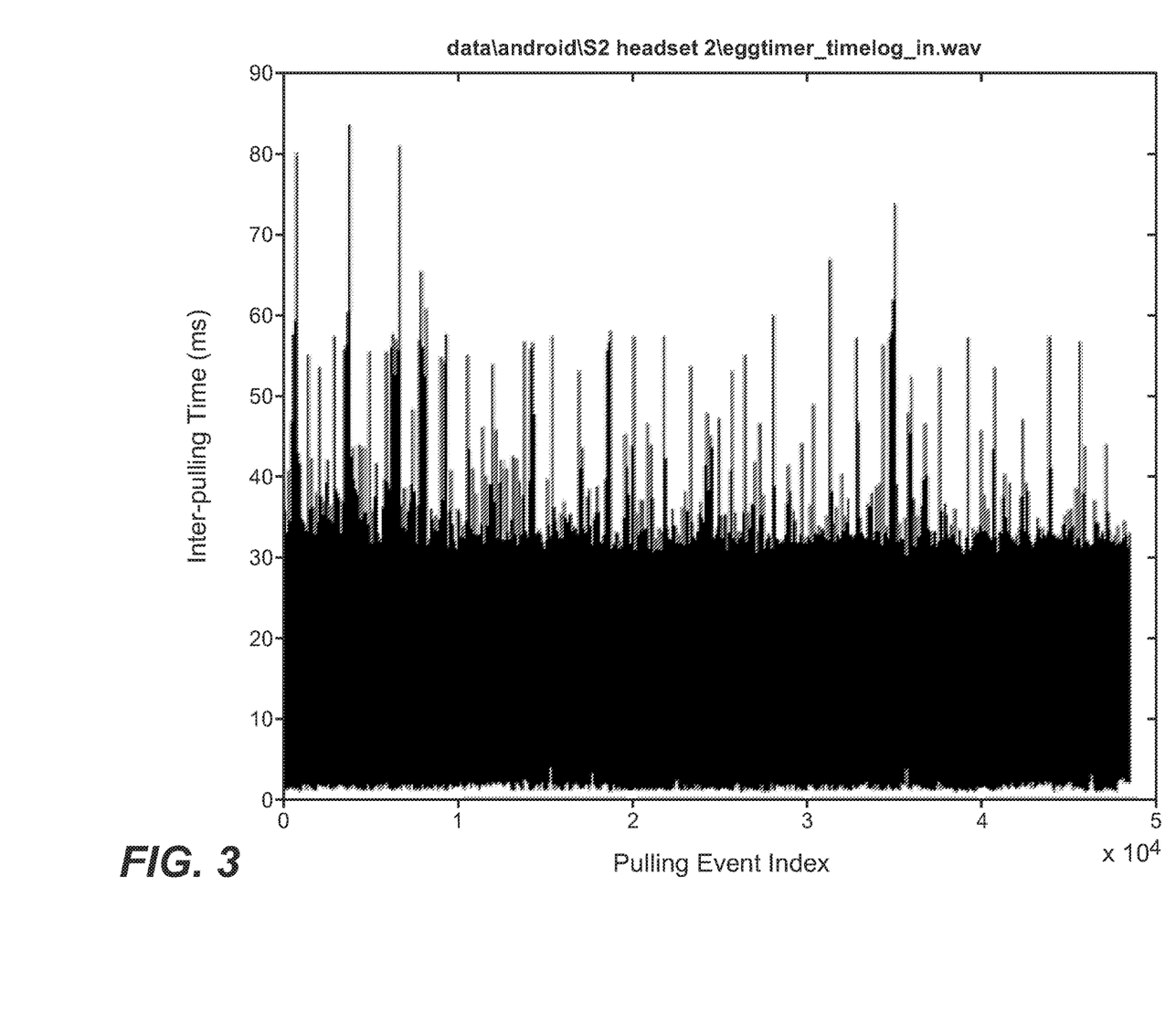
Figure 4:
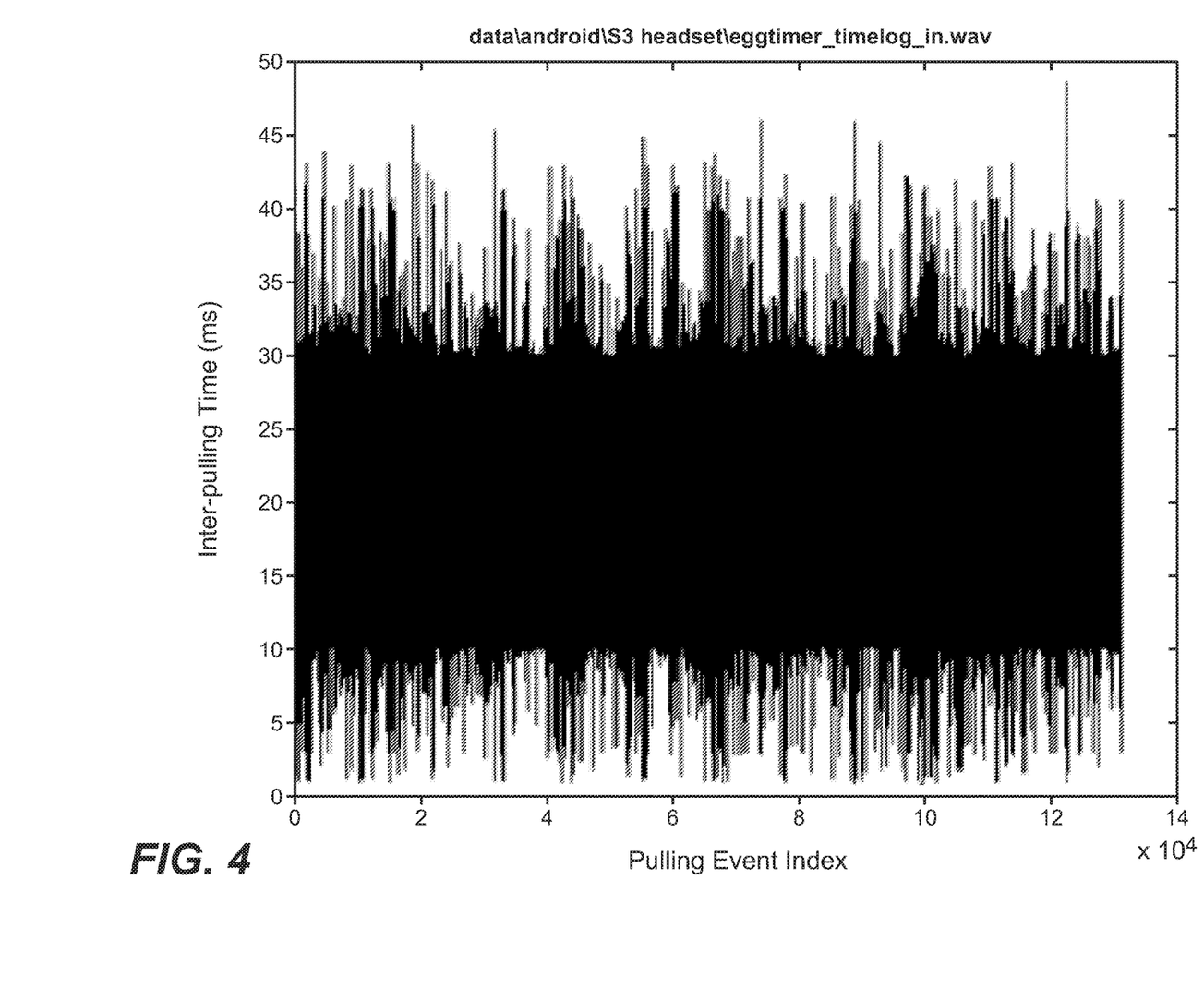
Figure 5:
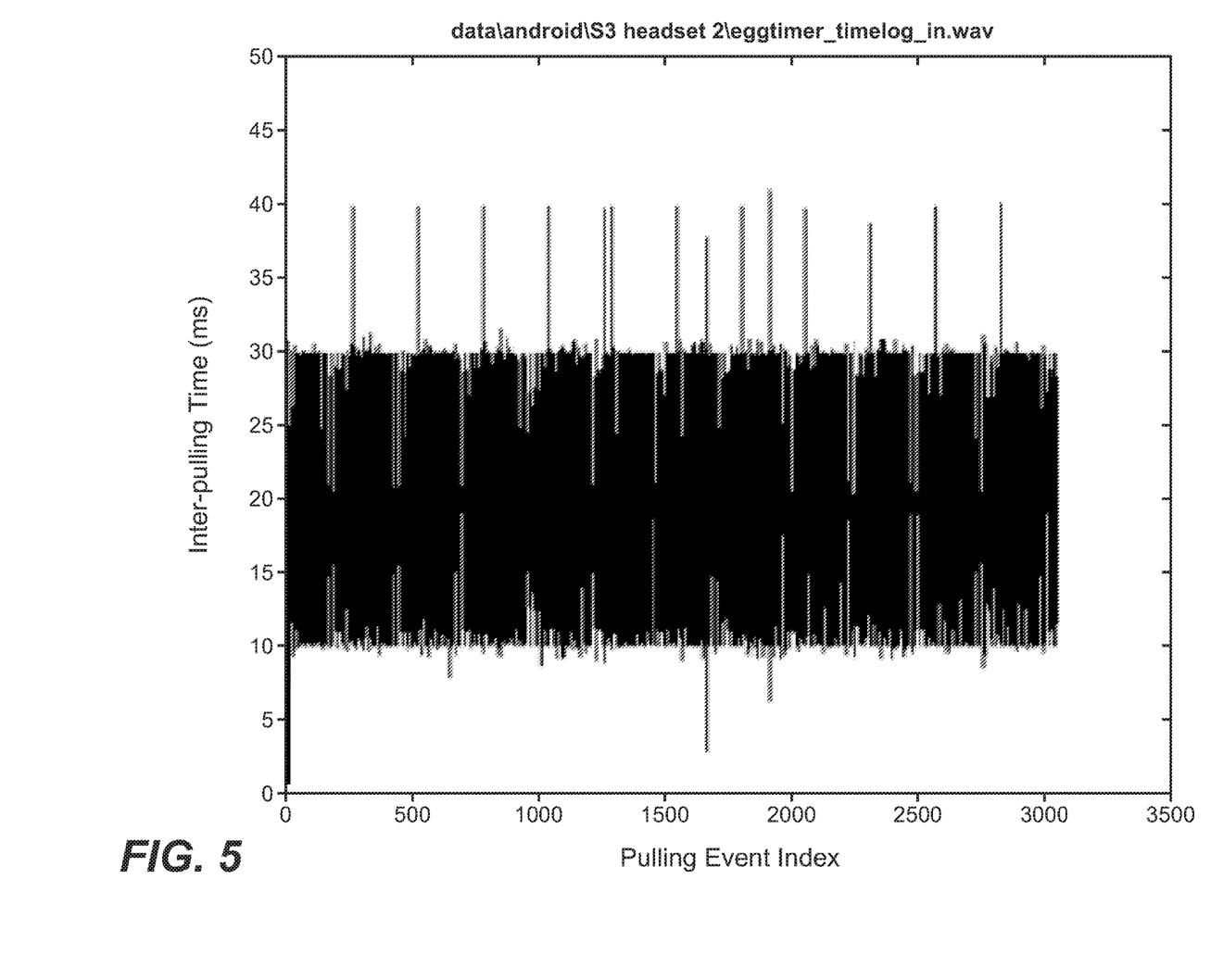

By way for further example, Jitter (inter-pulling time, IPT) plots for four traces are shown in FIG. 2 to FIG. 5. There is a big jump of IPT that is close to 900 ms in the plot of FIG. 2. Statistically the plots were found to have the following mean and standard deviations:

|  | FIG. 2 - S2 | FIG. 3 - S2 2 | FIG. 4 - S3 | FIG. 5 - S3 2 |
|---|---|---|---|---|
| Mean IPT (ms) | 20.0177 | 19.9976 | 19.9990 | 19.8964 |
| Std IPT (ms) | 8.5873 | 11.2717 | 6.6226 | 6.8227 |

When pull jitter is unaccounted for, a jitter buffer is likely to be sub optimal and could become overflowed or underflowed due to slower or faster pull rate, respectively. Ideally, a system and method which can handle multiple different sources of jitter is required.

SUMMARY OF THE INVENTION

It is an object of the invention, in its preferred form to provide an improved form of handling jitter from multiple sources.

In accordance with a first aspect of the present invention, there is provided in a packet switched voice delivery application which utilizes a jitter buffer for the delivery of sequential packet data, a method of determining a measure of the output jitter of taking packets out of the buffer, the method including the step of: (a) forming a pull jitter measure comprising the differential fetch times between sequential pull packets (e.g., packets that are fetched from the jitter buffer), divided by an expected time interval between packets (e.g., an expected time interval between fetch times of successive packets). That is, forming the pull jitter measure may include determining the differential fetch times between sequential pull packets and dividing same by the expected time interval between packets. The differential fetch times may be time differences (time intervals) between respective fetch times at which respective sequential packets are fetched from the buffer. The packets may be fetched (pulled) from the buffer by a pull thread including or being represented by an audio subsystem. The pull jitter measure may serve as the measure of the output jitter.

In some embodiments, the pull jitter measure can be rounded to a whole number, and can be quantized in terms of packet arrival times. The jitter measure can also be temporally smoothed.

Further, the invention can also include the step of combining the pull jitter measure with a network jitter measure to determine an overall jitter measure (e.g., overall total jitter measure). The network jitter measure can be quantized in units of expected network packet arrival times. The combining step preferably can include adding a predetermined weighted sum of the pull jitter measure and network jitter measure.

In some embodiments, the method can also include temporally smoothing the overall jitter measure. The temporal smoothing can be controlled by an external variable.

In some embodiments, the overall jitter measure or the smoothed overall jitter measure may be used to determine a desired length for the jitter buffer.

In accordance with another aspect of the present invention, there is provided a jitter buffer length estimator unit comprising: an input jitter buffer determination unit for determining an input jitter measure for the input of packets into a jitter buffer; a network jitter estimator unit (e.g., output jitter estimation unit or pull jitter estimation unit) for determining a pull jitter measure (e.g., output jitter measure) for removal of packets from the jitter buffer; and a jitter combiner unit for combining the input jitter measure and the pull jitter measure to produce an output jitter buffer length estimation (e.g., an estimation of a desired length of the jitter buffer). Ideally, the network jitter estimator unit temporally smoothes the pull jitter measure. Determination of the pull jitter measure by the network jitter estimation unit may be performed in the same manner as the forming of the pull jitter measure in the first aspect.

BRIEF DESCRIPTION OF THE DRAWINGS

Embodiments of the invention will now be described, by way of example only, with reference to the accompanying drawings in which.

DETAILED DESCRIPTION

In the preferred embodiment there is provided a method and system for handling various system jitters and network jitter in a unified framework, with the jitter being absorbed by the jitter buffer. The system provides a method of determining multi-thread pull jitter and network jitter estimation.

In particular, a method for determining a pull jitter measure is also provided.

In the preferred embodiment, a number of assumptions are made:

1. A first receive thread responsible for polling the network interface, accepting packets and putting them in the jitter buffer. The bulk of jitter buffer operations reside in this thread.

2. A pull thread where the drain such as the audio subsystem (for example a VoIP application) fetches packets from the jitter buffer for playback to a user.

3. A jitter buffer storing all the packets received from the network, performing all the necessary analysis and estimation. For example, the jitter buffer may need to: log packet arrival time, calculate arrival time jitter, estimate jitter buffer length or target latency and insert packets into the correct position in the jitter buffer.

Dealing with pull jitter is similar to dealing with network jitter so similar solutions apply, with the exception that pull jitter is normally expected to be more steady state. On a server it could include a number of peaks (i.e. very low most of the time and high during loaded situations).

Figure 6:
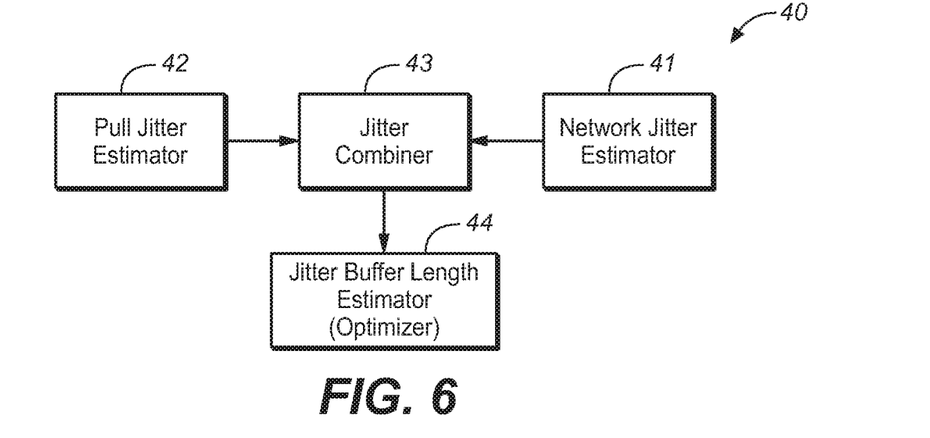
FIG. 6 illustrates the example process of combining multiple sources of jitter to provide an indicator of desired jitter buffer length.

The preferred embodiment utilises a series of threads to monitor jitter as illustrated in FIG. 6. A first thread monitors network jitter 41. A second thread monitors pull jitter. These two measures are combined by jitter combiner 43 to provide an overall measure of jitter. The overall measure is then used to determine a desired jitter buffer length 44.

Two example methods for estimating pull jitter are described below.

Method 1:

Assuming r(n) and f(n) denote the arrival time and fetch time for packet n, respectively, then in the pull thread, the instantaneous pull jitter or inter-pull time (IPT) measured in packets can be calculated as $$IPT(n) = \left\lfloor \frac{f(n) - f(n-1)}{L} + 0.5 \right\rfloor \quad (1)$$

where L represents an expected time interval between packets, e.g. 20 ms. In other words, L represents an expected time interval between fetch times of successive packets. A packet that is fetched from the buffer (e.g., by the pull thread) may be referred to as a pull packet.

It would be appreciated by those skilled in the art that the units utilised to represent pull jitter could, in the alternative, be in seconds or milliseconds, rather than quantize the time into packets. Furthermore, during quantization, a floor or ceil operation, rather than a round as shown in the equation above, can be used, which introduces an expected bias to IPT in the quantization process.

The instantaneous pull jitter is subsequently smoothed $$IPT_s(n) = IPT_s(n) + \alpha(IPT(n) - IPT_s(n-1)) \quad (2)$$

then in the receive thread, the total jitter, denoted H(n) is derived by adding pull jitter estimate $IPT_s(n)$ to the network jitter represented as inter-arrival time (IAT) as below:

$$IAT(n) = \left\lfloor \frac{r(n) - r(n-1)}{L} + 0.5 \right\rfloor \quad (3)$$

$$H(n) = IAT(n) + IPT_s(n) \quad (4)$$

Similarly, it would be appreciated by those skilled in the art that IAT can be represented in seconds or milliseconds, rather than in packets.

During quantization, a floor or ceil operation, rather than a round as shown in the equation above, can be used. The instantaneous network jitter estimate may be subject to an additional smoothing process.

Furthermore, pull jitter or network jitter could be represented as packet delay variation (PDV). Packet delay variation is described in as defined in PCT Application PCT/US2013/076387 entitled "Apparatus and Methods for Controlling Jitter Buffer", filed by the present applicant, the contents of which are incorporated by cross reference.

The total jitter can be a defined as a combination of PDV and IAT or IPT, e.g.:

$$H(n) = PDV(n) + IPT_s(n) \quad (5)$$

The total jitter estimate can be further smoothed before being fed to an optimization module, which generates a jitter buffer length estimate or target latency.

Method 2:

Alternatively the bulk of the operations could be shifted to the receive thread. Let N denote number of packets pulled between two arrived packet n and n−1. Then the average number of pull packets per time interval L is $$\overline{N}(n) = \left\lfloor N(n) \frac{L}{r(n) - r(n-1)} + 0.5 \right\rfloor \quad (6)$$

After this, the pull packet counter needs to set to zero in the receive thread:

$$N(n) = 0$$

Then the instantaneous and smoothed inter-pull jitter can be estimated as $$IPT(n) = |\overline{N}(n) - \overline{N}(n-1)| \quad (7)$$

$$IPT_s(n) = IPT_s(n) + \alpha(IPT(n) - IPT_s(n-1)) \quad (8)$$

Likewise the total jitter can be derived by combining pull jitter and network jitter as defined in equation 5 above.

In the pull thread, all that is required is to increase the pull packet counter N every time a packet is pulled from the jitter buffer.

Extensions

It can be seen that the 'forgetting' factor α controls the adaptation speed. A greater α leads to faster adaptation whereas a smaller α leads to slower adaptation and higher degree of smoothing. This parameter can be made adaptive depending on, but not limit to, the following example factors: (1) devices, and operating system, etc. For example, whether the host is an Android phone or an iPhone. If it's known that one device or OS has inherent larger scheduling jitter, a higher α may be used to avoid over-smoothing the pull jitter. (2) User behaviours and preferences or profiles. It may be possible to model users' usage behaviors such that one pre-defined profile can be selected from a candidate pool to indicate a level of history pull jitter.

There can be alternative ways of combining pull jitter and network jitter in addition to a simple sum as shown in Eqs. 4 or 5. For example, a weighting parameter can be added to emphasize pull jitter or network jitter.

$$H(n)=w\text{IAT}(n)+(1-w)\text{IPT}_s(n) \quad (9)$$

where w is a pre-defined constant in the range of [0, 1].

The combination of pull jitter and network jitter can be further controlled by a set of rules. For example, if either one of them is greater than a threshold, the rules may denote that the smaller should be ignored. Or if both of them are greater than their respected threshold, a final estimate may be chosen that is smaller than their combined value, that is $$H(n)=c(w\text{IAT}(n)+(1-w)\text{IPT}_s(n)) \quad (10)$$

where c is a pre-defined constant in the range of [0, 1].

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. In a packet switched voice delivery application which utilizes a jitter buffer for the delivery of sequential packet data, a method of determining a measure of the output jitter of taking packets out of the buffer by an audio subsystem, the method including the step of:
 storing voice over internet protocol (VoIP) packets in the jitter buffer;
 forming a pull jitter measure as the measure of the output jitter, the pull jitter measure comprising differential fetch times between sequential packets that are fetched from the buffer, divided by an expected time interval between packets, wherein the differential fetch times are time differences between respective fetch times at which respective sequential packets are fetched from the buffer;
 processing the fetched packets by a VoIP application based at least in part on the pull jitter measure; and
 transcoding the processed packets to an output format.

2. A method of determining a measure as claimed in claim 1 wherein said pull jitter measure is rounded to a whole number.

3. A method as claimed in claim 1 wherein said pull jitter measure is quantized in terms of packet arrival times.

4. A method as claimed in claim 1 wherein said jitter measure is temporally smoothed.

5. A method as claimed in claim 1 further comprising the step of combining the pull jitter measure with a network jitter measure to determine an overall jitter measure.

6. A method as claimed in claim 5 wherein the network jitter measure is quantized in units of expected network packet arrival times.

7. A method as claimed in claim 5 wherein said combining step includes adding a predetermined weighted sum of the pull jitter measure and network jitter measure.

8. A method as claimed in claim 5, further including the step of:
 determining a desired length of the buffer based on the overall jitter measure.

9. A method as claimed in claim 5 further comprising temporally smoothing the overall jitter measure.

10. A method as claimed in claim 9 wherein the degree of temporal smoothing is controlled by an external variable.

11. A method as claimed in claim 9, further including the step of:
 determining a desired length of the buffer based on the smoothed overall jitter measure.

12. A communication device comprising:
 a processor;
 a non-transitory computer-readable medium storing instructions that, upon execution by the processor, cause the processor to perform operations of determining a measure of the output jitter of taking packets out of the buffer, the operations comprising:
 determining an input jitter measure for the input of voice over internet protocol (VoIP) packets into a jitter buffer;
 determining a pull jitter measure for removal of packets from the jitter buffer, the pull jitter measure comprising differential fetch times between sequential packets that are fetched from the jitter buffer, divided by an expected time interval between packets, wherein the differential fetch times are time differences between respective fetch times at which respective sequential packets are fetched from the buffer;
 combining the input jitter measure and the pull jitter measure to produce an output jitter buffer length estimation;
 processing the fetched packets by a VoIP application according the jitter buffer length estimation; and
 transcoding the processed packets to an output format.

13. An estimator unit as claimed in claim 12 wherein said pull jitter estimator unit temporally smoothes said pull jitter measure.

14. An estimator unit as claimed in claim 12 wherein said jitter combiner unit adds a predetermined weighted sum of the pull jitter measure and the input jitter measure.

15. A non-transitory computer readable storage medium comprising instructions which, when executed by a processor, cause the processor to perform the method of claim 1.

* * * * *